(12) United States Patent
Kim et al.

(10) Patent No.: US 7,573,900 B2
(45) Date of Patent: Aug. 11, 2009

(54) APPARATUS AND METHOD FOR TRANSMITTING DATA USING TRANSMIT ANTENNA DIVERSITY IN A PACKET SERVICE COMMUNICATION SYSTEM

(75) Inventors: Sung-Jin Kim, Suwon-shi (KR); Hyeon-Woo Lee, Suwon-shi (KR); Sang-Hwan Park, Suwon-shi (KR); Ju-Ho Lee, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 1041 days.

(21) Appl. No.: 10/611,103

(22) Filed: Jun. 30, 2003

(65) Prior Publication Data

US 2004/0131038 A1 Jul. 8, 2004

(30) Foreign Application Priority Data

Jun. 29, 2002 (KR) ...................... 10-2002-0037697

(51) Int. Cl.
*H04J 3/16* (2006.01)
(52) U.S. Cl. ........................... 370/465; 343/853; 455/69
(58) Field of Classification Search ........................ None
See application file for complete search history.

(56) References Cited

U.S. PATENT DOCUMENTS

| 4,780,721 | A | 10/1988 | Dobson |
| 6,396,457 | B1 * | 5/2002 | Gatherer et al. ............. 343/853 |
| 6,584,302 | B1 * | 6/2003 | Hottinen et al. ............... 455/69 |
| 2003/0073410 | A1 * | 4/2003 | Hottinen et al. ............... 455/69 |

FOREIGN PATENT DOCUMENTS

| WO | WO 02/33850 | 4/2002 |
| WO | WO 02/51031 | 6/2002 |

\* cited by examiner

*Primary Examiner*—Robert W Wilson
(74) *Attorney, Agent, or Firm*—The Farrell Law Firm, LLP (57) ABSTRACT

An apparatus and method for transmitting packet data through at least two transmit antennas in a packet data communication system using transmit antenna diversity. In the packet transmitting apparatus, a feedback information interpreter interprets feedback information including CQIs and antenna weights received from a plurality of UEs requesting a packet data service. A weight generator classifies the antenna weights and selects UEs having orthogonal weights. A transmitter applies the selected weights to packet data destined for the selected UEs and transmits the packet data to the selected UEs simultaneously.

14 Claims, 7 Drawing Sheets

FIG. 8

APPARATUS AND METHOD FOR TRANSMITTING DATA USING TRANSMIT ANTENNA DIVERSITY IN A PACKET SERVICE COMMUNICATION SYSTEM

PRIORITY

This application claims priority under 35 U.S.C. § 119 to an application entitled "Apparatus and Method for Transmitting Data Using Transmit Antenna Diversity in a Packet Service Communication System" filed in the Korean Intellectual Property Office on Jun. 29, 2002 and assigned Serial No. 2002-37697, the contents of which are herein incorporated by reference.

BACKGROUND OF THE INVENTION

1. Field of the Invention

The present invention relates generally to a packet service communication system, and in particular, to an apparatus and method for transmitting data using transmit antenna diversity in a packet service communication system.

2. Description of the Related Art

In general, a packet service communication system is designed to transmit a large volume of burst packet data to a plurality of user equipments (UEs). In particular, HSDPA (High Speed Downlink Packet Access) was proposed as a packet service communication system suitable for transmission of a large volume of data at a high rate.

HSDPA is a generic term referring to devices, systems and methods using a HS-DSCH (High Speed-Downlink Shared CHannel) for supporting downlink packet data transmission at a high rate and its related control channels in a W-CDMA (Wideband-Code Division Multiple Access System). For simplicity, HSDPA, which was proposed by the 3GPP ($3^{rd}$ Generation Partnership Project) and adopted as the standard for $3^{rd}$ generation asynchronous mobile communication systems, will be described by way of example. It is to be appreciated that the present invention is also applicable to any other system implementing transmit antenna diversity through two or more transmit antennas.

Three techniques have been introduced into the HSDPA communication system to support high-speed packet data transmission: AMC (Adaptive Modulation and Coding), HARQ (Hybrid Automatic Retransmission Request), and FCS (Fast Cell Select). These techniques are described hereinbelow:

The AMC technique provides a modulation scheme and a coding method, which are selected for a data channel according to the channel condition between a Node B and a UE, to thereby increase the use efficiency of the entire cell. Modulation schemes and codings are used in combination. Each modulation and coding combination is termed an MCS (Modulation and Coding Scheme). MCSs can be labeled with level 1 to level N. A data channel signal is modulated and encoded by an MCS adaptively chosen according to the channel condition between the UE and its communicating Node B. Thus, the system efficiency of the Node B is increased.

In accordance with a typical ARQ (Automatic Retransmission Request), ACK (Acknowledgement) signals and retransmission packet data are exchanged between a UE and an RNC (Radio Network Controller). Meanwhile, the HARQ scheme, especially an N-channel SAW HARQ (N-channel Stop And Wait HARQ), adopts the following two novel procedures to increase ARQ transmission efficiency. One is to exchange a retransmission request and its related response between a UE and a Node B, and the other is to temporarily store bad data and combine the stored data with a retransmission version of the data. In the HSDPA communication system, ACK signals and retransmission packet data are exchanged between the UE and the MAC (Medium Access Control) HS-DSCH of the Node B, and the N-channel SAW HARQ establishes N logical channels and transmits a plurality of packets without receiving an ACK signal for a previous transmitted packet. As compared to the N-channel SAW HARQ technique, the SAW ARQ technique requires reception of an ACK signal for a previous transmitted packet data to transmit the next packet data. Thus the ACK signal must be awaited for the previous packet despite the capability of transmitting the current packet data. On the contrary, the N-channel SAW HARQ allows transmission of successive packets without receiving the ACK signal for the previous packet data, resulting in the increase of the channel use efficiency. That is, N logical channels, which can be identified by their assigned times or channel numbers, are established between the UE and the Node B, so that the UE can decide the channel that has delivered a received packet and take an appropriate measure such as rearrangement of packets in the right order or soft combining of corresponding packet data.

In the FCS technique, when a UE supporting HSDPA is positioned in a soft handover region, it fast selects a cell in a good channel condition. Specifically, if the UE enters a soft handover region between a first Node B and a second Node B, it establishes radio links with a plurality of Node Bs. A set of Node Bs with which the radio links are established are called an active set. The UE receives HSDPA packet data only from the cell in the best channel condition, thus reducing the whole interference. The UE also monitors channels from the active Node Bs periodically. In the presence of a cell better than the current best cell, the UE transmits a best cell indicator (BCI) to all the active Node Bs to substitute-the new best cell for the old best cell. The BCI includes the ID of the new best cell. The active Node Bs check the cell ID included in the received BCI and only the new best cell transmits packet data to the UE on the HS-DSCH.

As described above, many novel techniques have been proposed in order to increase data rate in the HSDPA communication system. The data rate increase is a dominant factor determining performance in 1×EV-DO (Evolution-Data Only) and 1×EV-DV (Evolution-Data and Voice) as well as HSDPA. Aside from AMC, HARQ, and FCS, a multiple antenna scheme is used as a way to increase data rate. Since the multiple antenna scheme is performed in the space domain, it overcomes the problem of limited bandwidth resources in the frequency domain. The multiple antenna scheme is realized usually by nulling, which will be described in detail later.

Before undertaking the description of the multiple antenna scheme, multi-user diversity scheduling will first be described. A packet service communication system such as HSDPA decides the states of a plurality of user channels requesting packet service based on their feedback information and transmits packet data on a user channel having the best channel quality. The resulting SNR (Signal-to-Noise Ratio) gain increase effects diversity. A diversity order representing a diversity gain corresponds to the number of users requesting packet service at the same time.

Under a radio channel environment, a mobile communication system suffers signal distortion because of various factors such as multi-path interference, shadowing, propagation attenuation, time-varying noise, and interference. Fading caused by multi-path interference is closely associated with the mobility of a reflective object or a user, that is, the mobility of a UE. The fading results in mixed reception of an actual transmission signal and an interference signal. The received signal is eventually a transmission signal involving serious distortion, which degrades the entire mobile communication system performance. Fading is a serious obstacle to high-speed data communication in a radio channel environment in that the fading incurs distortion in the amplitude and phase of a received signal. In this context, transmit antenna diversity, which is a type of multiple antenna scheme, has emerged as an effective way to combat fading.

Transmit antenna diversity seeks to minimize fading-caused data loss and thus increase data rate by transmitting a signal through at least two antennas.

Transmit antenna diversity is classified into time diversity, frequency diversity, multi-path diversity, and space diversity.

Space diversity is used for a channel having a small delay spread, for example, an indoor channel and a pedestrian channel being a slow fading Doppler channel. The space diversity scheme achieves diversity gain by use of two or more antennas. If a signal transmitted through one antenna is attenuated by fading, diversity gain is obtained by receiving signals transmitted through the other antennas. Space diversity is further branched into receive antenna diversity using a plurality of receive antennas and transmit antenna diversity using a plurality of transmit antennas.

Frequency diversity achieves diversity gain from signals transmitted with different frequencies and propagated in different paths. In this multi-path diversity scheme, the multi-path signals have different fading characteristics. Therefore, diversity is obtained by separating the multi-path signals from each other.

The transmit antenna diversity scheme is implemented in a closed loop or an open loop. The closed loop transmit antenna diversity differs from the open loop one in that a UE feeds back downlink channel information to a Node B in the former, while the feedback information is not required in the latter. For the feedback, the Node B transmits a different pilot signal through each transmit antenna. The UE measures the phase and power of the received pilot channel for each transmit antenna and selects an optimum weight based on the phase and power measurements.

The mobile communication system must overcome fading that seriously influences communication performance in order to carry out high-speed data transmission reliably. This is because fading reduces the amplitude of a received signal by several decibels to tens of decibels. Hence, the above-described diversity schemes are adopted to combat fading. For example, a CDMA communication system uses a rake receiver for implementing diversity reception based on the delay spread of a channel. Besides the above-described methods, the data rate can be increased by carrying out coherent transmission utilizing the characteristics of a space channel. Thus, SNR increases in proportion to the number of antennas.

Meanwhile, antenna beamforming increases limited system transmission capacity in the packet service communication system. The antenna beamforming is signal transmission from a plurality of directional antennas. To prevent a signal transmitted through one antenna from interfering with a signal transmitted through another antenna, nulling is used. The nulling technique can increase the volume of transmitted packet data only if antenna beamforming is performed with antennas spaced by a predetermined gap. It is not feasible when the gap between antennas is rather wide. The antennas are spaced by a relatively short distance $$\frac{\lambda}{2}$$

for antenna beamforming, whereas they are spaced by a relatively long distance 10λ for transmit antenna diversity. Since there are no correlations between antennas in terms of antenna distance, it is impossible to apply nulling for the transmit antenna diversity.

As described above, beamforming is a technique using nulling based on correlations between antennas spaced by a relatively short distance, for example, $$\frac{\lambda}{2}.$$

The nulling technique makes antenna weights $w_1^H h_2 = 0$ and $w_2^H h_1 = 1$ so that a first UE receives only its signal $r_1$, not data $d_2$ for a second UE and the second UE also receives only its data $d_2$, not the signal $r_1$ for the first UE. Here, $w_1$ is a weight for the first UE and $w_2$ is a weight for the second UE. $h_1$ is a channel delivering the signal $r_1$ and $h_2$ is a channel delivering the signal $r_2$. The mathematical expression of nulling is presented in Equation 1 as follows.

$$W_{Mode-1}^H W = \begin{bmatrix} 2 & 1+j & 0 & 1-j \\ 1-j & 2 & 1+j & 0 \\ 0 & 1-j & 2 & 1+j \\ 1+j & 0 & 1-j & 2 \end{bmatrix} \quad (1)$$

If a channel condition is set in the manner that always generates weights satisfying the above condition, co-channel interference is completely eliminated and thus system capacity is in fact doubled. Nulling is always possible theoretically if the number of UEs to be nulled, including a desired UE, is less than that of the number of antennas by one. However, this ideal situation is possible only when the antennas are fully correlated and differ from each other only in phase. Therefore, the beamforming nulling technique is very difficult to realize in a radio channel environment for mobile communication.

As compared to beamforming, there are little correlations between antennas spaced by a relatively long distance, for example, 10λ in the multiple antenna system. Hence, the nulling technique is not applicable, especially in the CDMA mobile communication system, because the number of antennas exceeds that of UEs being serviced at the same time, and thus exceeds the number of degrees of freedom to set specific signal processing weight values for nulling (i.e., number of antennas–1).

To realize transmit antenna diversity, a transmit antenna array (TxAA) is used. A TxAA is operated in a first TxAA mode (TxAA mode 1) or a second TxAA mode (TxAA mode 2). In TxAA mode 1, UEs calculate weights $w_1$ and $w_2$ maximizing signal reception power using pilot signals received from a Node B. The UEs then deliver the weights $w_1$ and $w_2$ to the Node B on a particular channel, for example, in an FBI (FeedBack Information) field of a DPCCH (Dedicated Physical Control Channel). Four weights 00, 01, 10 and 11 are available to the UEs in TxAA mode 1. As compared to TxAA mode 1, all power information including phase and amplitude is controlled in TxAA mode 2. While TxAA mode 1 addresses only phase, TxAA mode 2 additionally controls amplitude. A total of 16 weights are defined which represent phases and amplitudes separately.

A weight w is related to a transmit antenna array channel h, as w=h (w and h are vectors). An FDD (Frequency Division Duplex) mobile communication system requires a UE to feedback transmission channel information to a Node B so that the Node B is informed of a transmission channel because the characteristics of a transmission channel and a reception channel are different. To do so, the UE computes a weight and feeds the weight information back to the Node B in the channel h in TxAA mode 1 or TxAA mode 2. In TxAA mode 1, only a phase component is quantized in two bits in the weight information w=[$1w_1 1 \exp(j\theta 1)$, $1w_2 1\exp(j\theta 2)$], and fed back to the Node B. Therefore, the phase accuracy is $\pi/2$ and the quantization error is up to $\pi/4$. To increase the efficiency of the feedback, one of the two bits is refined by updating it each time. For example, 2-bit combinations {b(2k), b(2k−1)} and {b(2k), b(2k+1)} are available. Here, b is a bit feedback on a slot basis each time. In TxAA mode 2, the components of the weight information, both phase and amplitude, are fed back. The phase is 3 bits and the amplitude is 1 bit. Hence, the phase accuracy is $\pi/4$ and the quantization error is up to $\pi/8$. To increase the efficiency of the feedback, one of the four bits is refined by updating it each time in a progressive refinement mode. While each bit is an orthogonal basis in a refinement mode, there is no such regulation in the progressive refinement mode.

In view of the nature of the HSDPA communication system, packet data is transmitted on a predetermined unit basis, for example in frames, to a UE in the best channel condition. Channel quality information is received from a plurality of UEs requesting HSDPA service and their channel conditions are decided based on the channel quality information. The UE in the best channel condition is selected and packet data is delivered only to the selected UE at a corresponding point in time. Therefore, even if system transmission resources are available to more UEs, only the selected UE receives the HSDPA service. As a result, the efficiency of the transmission resources is reduced.

SUMMARY OF THE INVENTION

It is, therefore, an object of the present invention to provide an apparatus and method for transmitting data using transmit antenna diversity in a packet service communication system.

It is another object of the present invention to provide an apparatus and method for implementing transmit antenna diversity, which maximizes transmission capacity in a packet service communication system.

The above objects are achieved by an apparatus and method for transmitting packet data through at least two transmit antennas in a packet data communication system using transmit antenna diversity. In the packet data transmitting apparatus, a feedback information interpreter interprets feedback information including CQIs (Channel Quality Indicators) and antenna weights received from a plurality of UEs requesting a packet data service. A weight generator classifies the antenna weights and selects UEs having orthogonal weights. A transmitter applies the selected weights to packet data destined for the selected UEs and transmits the packet data to the selected UEs simultaneously.

In the packet transmitting method, feedback information including CQIs and antenna weights received from a plurality of UEs requesting a packet data service are interpreted. The antenna weights are classified into weight groups and orthogonal weights are selected as weights to be applied to the transmit antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
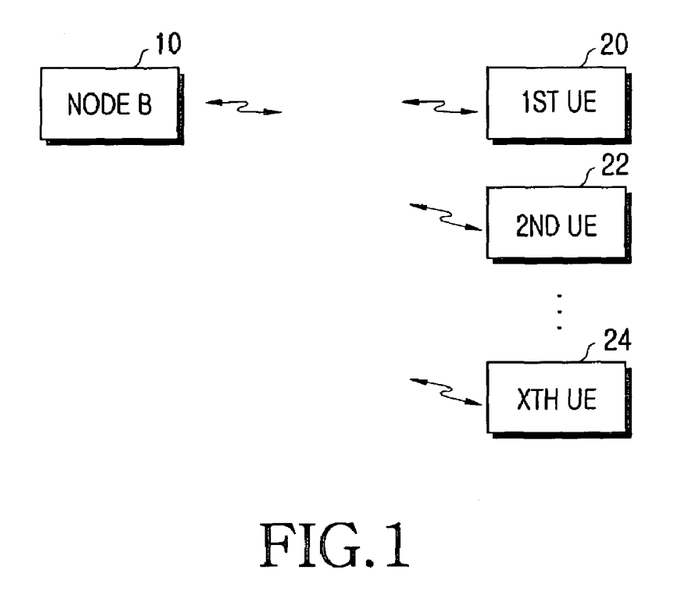
FIG. 1 is a schematic view illustrating a packet communication system to which the present invention is applied.

FIG. 1 is a schematic view illustrating a packet communication system to which the present invention. Referring to FIG. 1, a Node B 10 supports a packet service, for example, HSDPA for high-speed data transmission. First to Xth UEs 20 to 24 are wirelessly connected to the Node B 10, for receiving the packet service. The Node B 10 employs transmit antenna diversity, particularly TxAA. Hence, it transmits data through two or more transmit antennas. TxAA operation modes are classified into TxAA mode 1 and TxAA mode 2. The Node B transmits a pilot signal to the UEs 20 to 24. Each UE detects downlink channel characteristics from the received pilot signal and decides weight & CQI (Channel Quality Indicator) information based on the downlink channel characteristics. Here, the CQI information is determined in consideration of a weight for a corresponding TxAA mode. The UE then transmits the weight & CQI information to the Node B 10 on a particular channel, for example, in an FBI field of a DPCCH.

Figure 2:
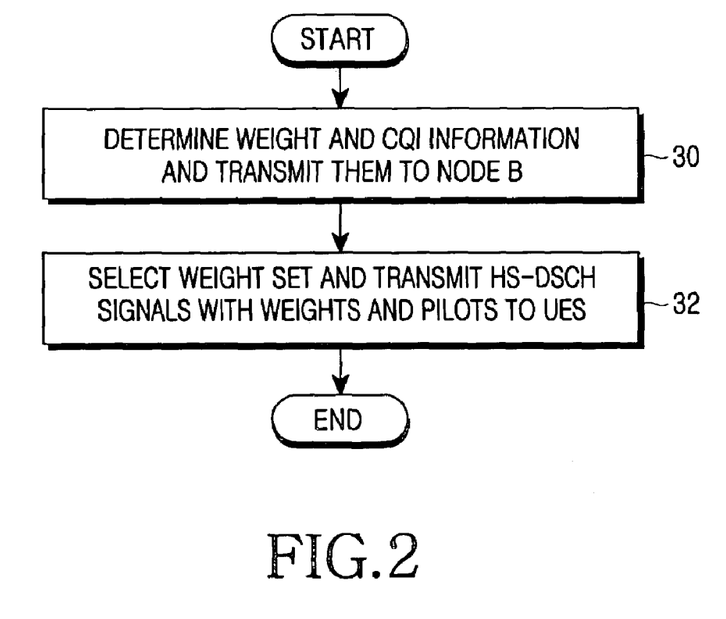
FIG. 2 is a flowchart illustrating data transmission in a transmit antenna diversity scheme in a packet communication system according to the present invention.

In the context of transmit antenna diversity in TxAA mode 1, the present invention will be described. Data transmission using transmit antenna diversity in the manner that maximizes transmission capacity will be described with reference to FIG. 2. FIG. 2 is a flowchart illustrating data transmission in a transmit diversity scheme in a packet communication system according to the present invention.

Referring to FIG. 2, a plurality of UEs receive pilot channel signals from a Node B and detect the characteristics of downlink channels, that is, TxAA mode 1 channels from the received pilot channel signals in step 30. Channel characteristics detection is known to those skilled in the art and thus its description is not provided here. Each of the UEs decides weight & CQI information based on the TxAA mode 1 channel characteristics and transmits the weight & CQI information to the Node B in the FBI field of the DPCCH.

In step 32, the Node B detects weights and CQIs from the feedback information of each UE and classifies the weights w. Since four weights are available in TxAA mode 1, the Node B groups the received weights correspondingly. The Node B then detects a maximum CQI for each weight group and sums each of CQI pairs corresponding to orthogonal weight pairs.

The Node B transmits the addition of data and a pilot channel signal to UEs having CQIs that form the greatest sum in step 32.

To describe the above in more detail, the first to Xth UEs 20 to 24 operate in the same manner and the Node B 10 is equipped with at least two transmit antennas. The Node B 10 detects weights and CQIs from feedback information received from the UEs 20 to 24. It processes HS-DSCH signals in space diversity according to selected weights. The Node B 10 then transmits the sums of the HS-DSCH signals and pilot channel signals to UEs. A pilot signal Pi(k) ($1 \leq i \leq B$, where B is the number of transmit antennas, 2 or greater) can be a CPICH (Common Pilot Channel) signal, a dedicated pilot signal on a DPCCH, or a S-CPICH (Secondary-CPICH) signal. In other words, any channel is available as far as it includes a parameter by which downlink channel characteristics and weights are decided.

Considering the downlink channel characteristics of the respective transmit antennas (hereinafter, referred to as first channel characteristics H, where H is a matrix), the UEs 20 to 24 determine weights and CQIs. The first channel characteristics H represent the phases and amplitudes of a channel signal received at a UE. The columns of the first channel characteristics H matrix denote transmit antenna channels and the rows thereof denote a sequential arrangement of delayed signals. That is, the column components are obtained in the spatial domain associated with the transmit antennas, and the row components, in the time domain. The UEs 20 to 24 then transmit the weights and CQIs to the Node B 10 in the FBI field of the DPCCH.

Embodiment 1

In accordance with the first embodiment of the present invention, a Node B selects orthogonal weights corresponding to maximum CQIs from feedback information received from a plurality of UEs and transmits data to UEs having the selected weights.

Figure 3:
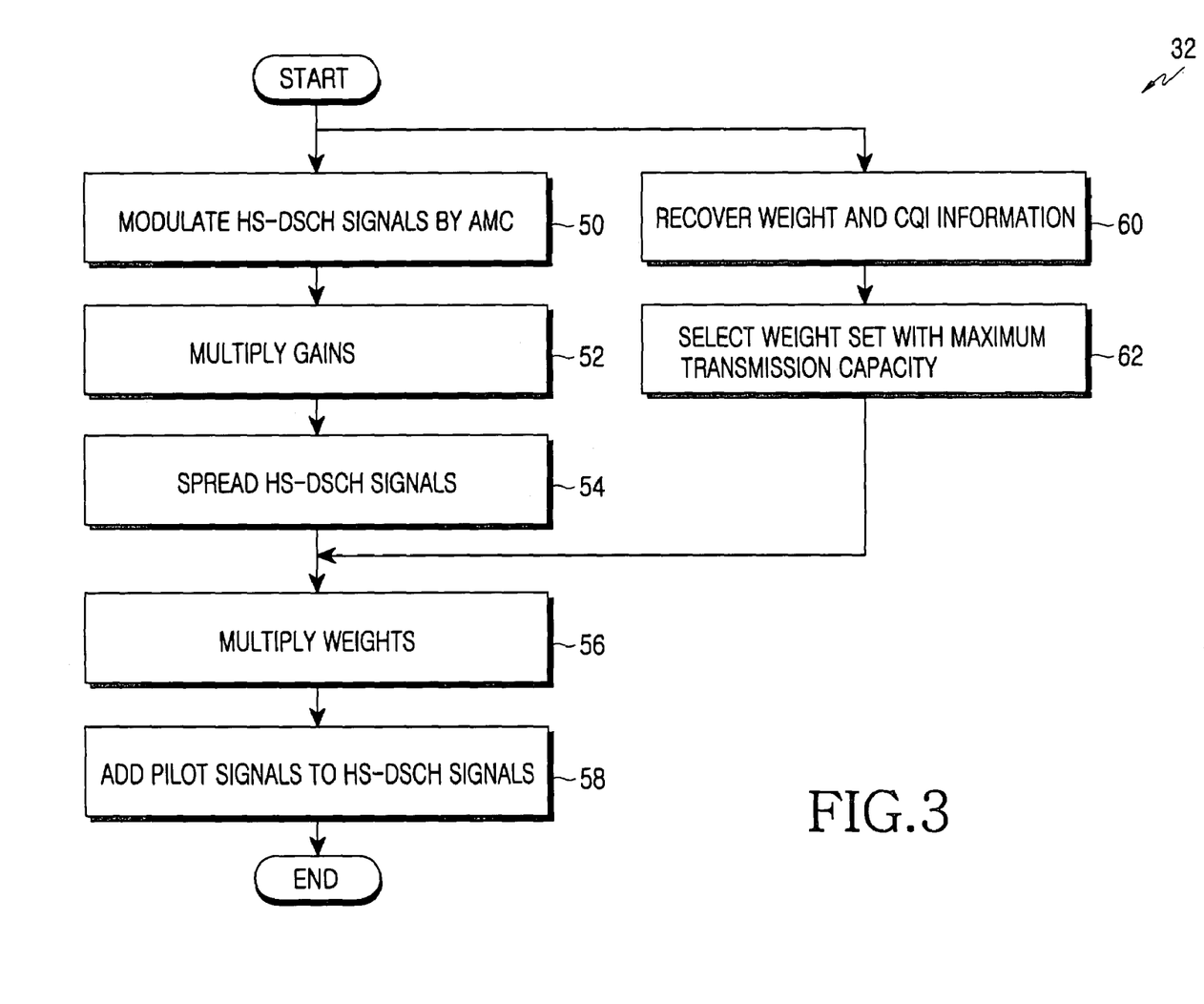
FIG. 3 is a detailed flowchart illustrating the operation of a Node B according to an embodiment of the present invention.
Figure 4:
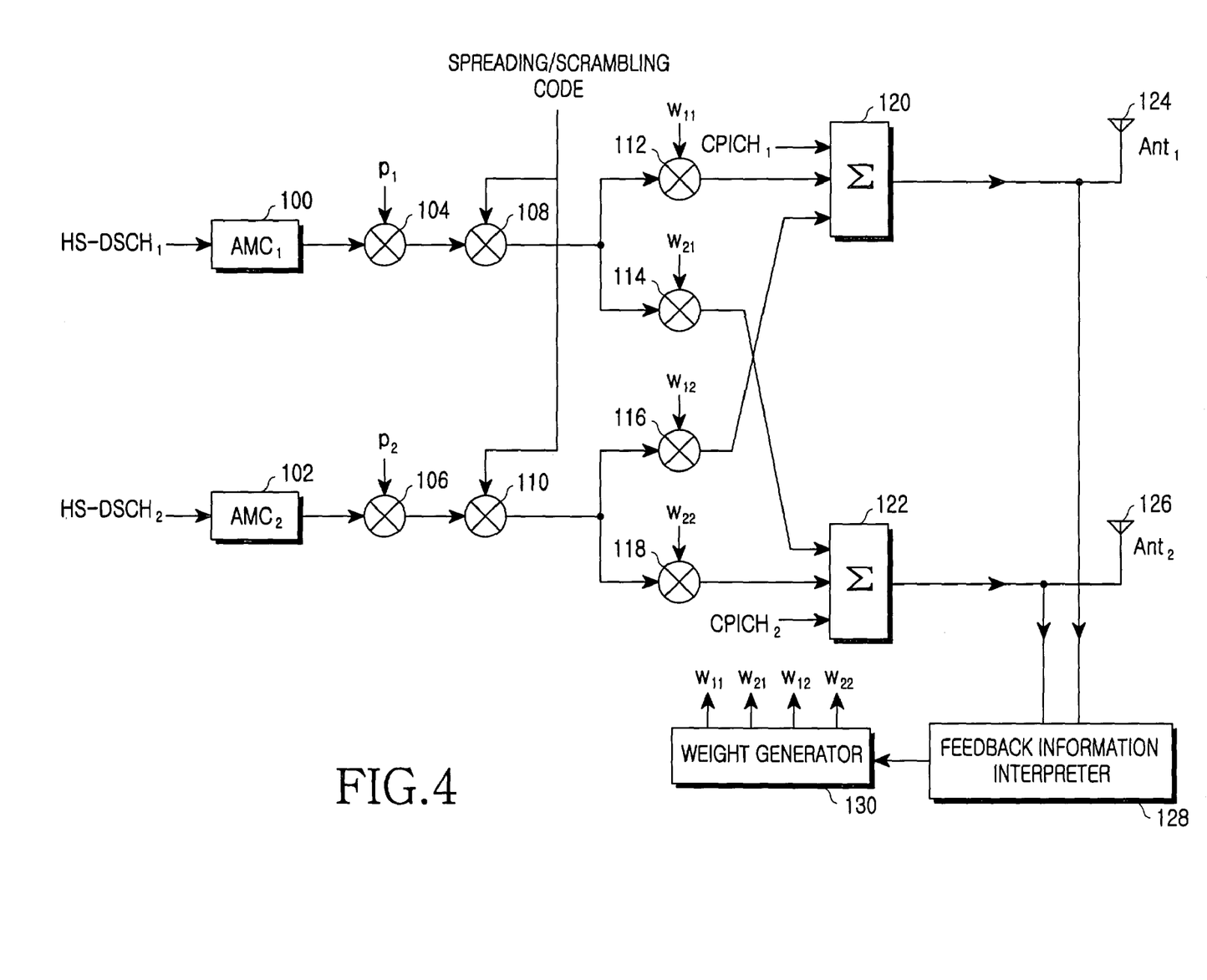
FIG. 4 is a block diagram of the Node B according to the embodiment of the present invention.

FIG. 3 is a flowchart illustrating the operation of the Node B and FIG. 4 is a block diagram of the Node B according to the first embodiment of the present invention.

Referring to FIG. 4, the Node B 10 illustrated in FIG. 1 is comprised of AMC units 100 and 102 for applying AMC, gain multipliers 104 and 106, spreaders 108 and 110, weight multipliers 112, 114, 116 and 118, pilot summers 120 and 122, antennas 124 and 126, a feedback information interpreter 128, and a weight generator 130. The antennas 124 and 126 receive feedback information from the first to Xth UEs 20 to 24 on DPCCHs and transmit spatially processed HIS-DSCH signals and CPICH signals to the UEs 20 to 24.

Referring to FIG. 3, the feedback information interpreter 128 interprets weight & CQI information from the feedback information received through the antennas 124 and 126 in step 60. The weight generator 130 selects optimum weights and gains according to the interpreted weight & CQI information and outputs the weights to the weight multipliers 112 to 118 and the gains to the gain multipliers 104 and 106 in step 62. The remaining steps of FIG. 3 will be described below.

Figure 5:
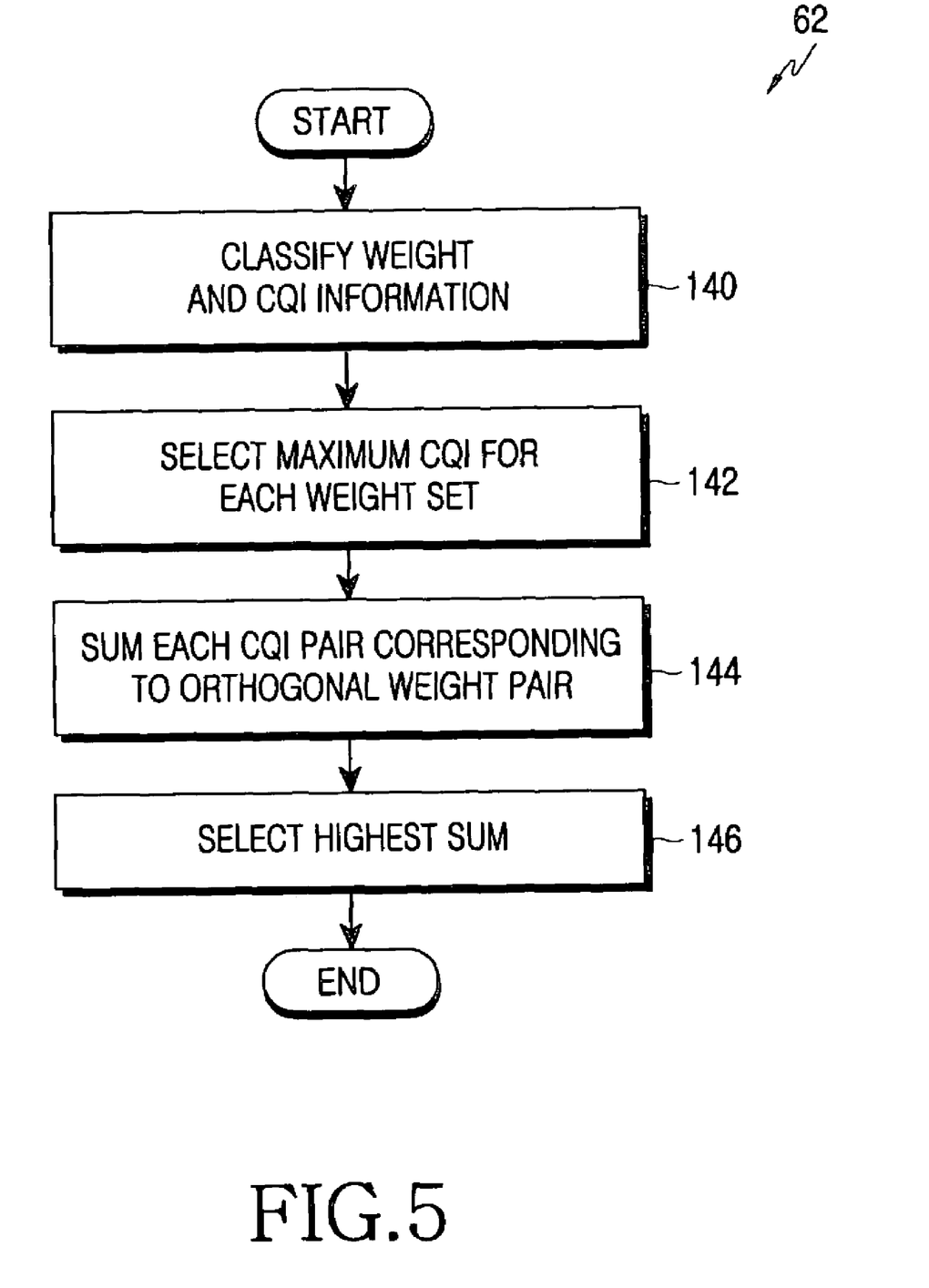
FIG. 5 is a detailed flowchart illustrating the operation of a weight generator 130 illustrated in FIG: 4.

FIG. 5 is a detailed flowchart illustrating the operation of the weight generator 130. Referring to FIG. 5, the weight generator 130 classifies CQIs according to the type of weight information (step 140), selects a maximum CQI for each weight group (step 142), sums each CQI pair corresponding to an orthogonal weight pair (step 144), and selects the highest CQI sum (step 146).

Figure 6:
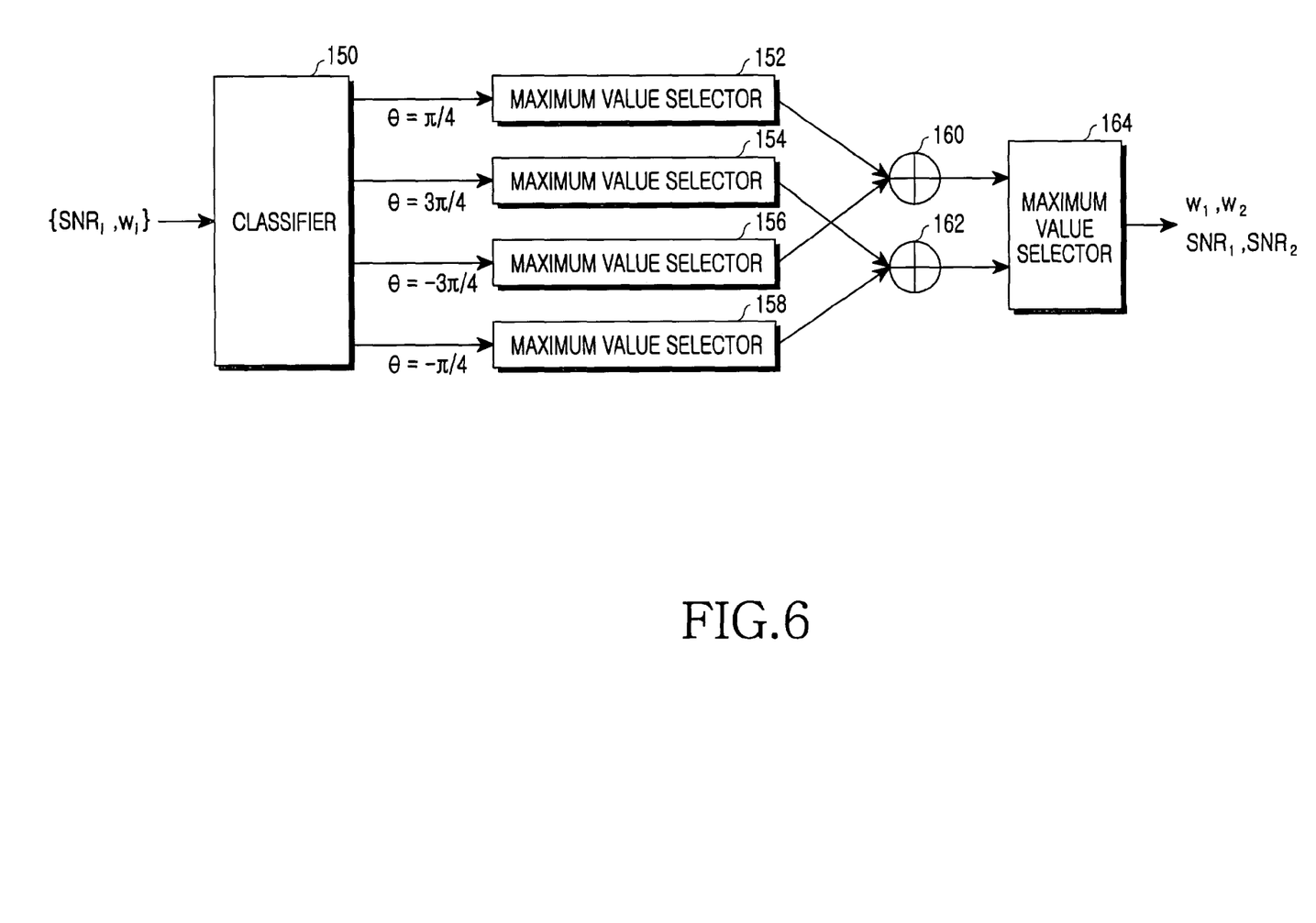
FIG. 6 is a block diagram of a weight generator 130 illustrated in FIG. 4.

FIG. 6 is a block diagram of the weight generator 130 illustrated in FIG. 4. Referring to FIG. 6, the weight generator 130 includes a classifier 150, maximum value selectors 152, 154, 156 and 158, summers 160 and 162, and a maximum value selector 164.

Referring to FIGS. 5 and 6, the classifier 150 groups weights in step 140. Four (4) types of weights are defined ($w \subset [1, \exp(j\theta)]$, $\theta = n\pi/4$, $n=1, 3, \ldots, 7$) in TxAA mode 1, and 16 types of weights are defined ($w \in [a, \sqrt{1-a^2} \exp(j\theta)]$, $\theta = n\pi/8$, $n=1, 3, \ldots, 7$, $a=0.2, 0.8$) in TxAA mode 2.

The maximum value selectors 152 to 158 select a maximum CQI for each weight group in step 142. The maximum CQIs from the maximum value selectors 152 and 156 for $$\theta = \frac{\pi}{4} \text{ and } \theta = -\frac{3\pi}{4},$$

respectively are applied to the summer 160, while maximum CQIs from the maximum value selectors 154 and 158 for $$\theta = \frac{3\pi}{4} \text{ and } \theta = -\frac{\pi}{4},$$

respectively are applied to the summer 162. The reason for feeding the CQIs to the different summers 160 and 162 is that the weights corresponding to a CQI pair fed to the same summer are orthogonal.

The summers 160 and 162 function to sum the transmission capacities of orthogonal channels in TxAA mode 1. This procedure is also applicable to TxAA mode 2 based on the idea of weight orthogonality.

Assuming that a weight set for TxAA mode 1, $W_{model} = [w_1, w_2, w_3, w_4]$, $W_k = [1 \; \exp(\pi/4)(2k-1))]^T$, orthogonal weight pairs are detected by Eq. (2).

$$r_1 = (w_1^H d_1 + w_2^H d_2) h_1 + n_1 = (w_1^H d_1 + 0) h_1 + n_1$$
$$r_2 = (w_1^H d_1 + w_2^H d_2) h_2 + n_2 = (0 + w_2^H d_2) h_1 + n_2 \quad (2)$$

where elements represented by zeroes are mutually orthogonal and thus the sums of $w_1$ and $w_3$ and of $w_2$ and $w_4$ are equivalent to the sums of transmission capacities of orthogonal channels, and where n(i) is noise on the "i"th user's receiver signal and d(i) is data transmitted to the "i"th user.

The summers 160 and 162 each sum the received weights in step 144 and the maximum value selector 164 selects the higher of the sums and outputs CQIs ($CQI_i$, $CQI_j$) that form the higher sum, and weights ($w_i$, $w_j$) & indexes (i, j) corresponding to the CQIs in step 146. The indexes identify UEs which have the selected CQIs and weights and thus will receive the packet service.

Referring back to FIGS. 3 and 4, the AMC units 100 and 102 modulate HS-DSCH signals, HS-DSCH, and HS-DSCH$_2$ in a predetermined AMC in step 50. The gain multipliers 104 and 106 multiply the modulated signals by their respective gains $p_1$ and $p_2$ in step 52. The spreaders 108 and 110 multiply the outputs of the gain multipliers 104 and 106 by a predetermined scrambling/spreading code and output the spread signals to the weight multipliers 112 & 114 and 116 & 118, respectively in step 54.

The weight multipliers 112 to 118 multiply the spread signals by weights $w_1$, $w_2$, $w_3$, and $w_4$ received from the weight generator 130 in step 56 of FIG. 3. Specifically, the weight multipliers 112 and 114 multiply the spread signal received from the spreader 108 by the weights $w_{11}$, and $w_{21}$, respectively. The outputs of the weight multipliers 112 and 114 are provide to the summers 120 and 122, respectively. The weight multipliers 116 and 118 multiply the spread signal received from the spreader 110 by the weights $w_{12}$ and $w_{22}$, respectively. The outputs of the weight multipliers 116 and 118 are provided to the summers 120 and 122, respectively.

The summer 120 sums the received signal and a first CPICH signal, $CPICH_1$, and the summer 122 sums the received signal and a second CPICH signal, $CPICH_2$ in step 58. The summed signals are transmitted through the antennas 124 and 126, respectively.

Embodiment 2

In accordance with the second embodiment of the present invention, the Node B transmits packet data using quasi-orthogonal scrambling codes in the case where orthogonal weights' corresponding to maximum CQIs selected from feedback information received from a plurality of UEs are not fully orthogonal.

Figure 7:
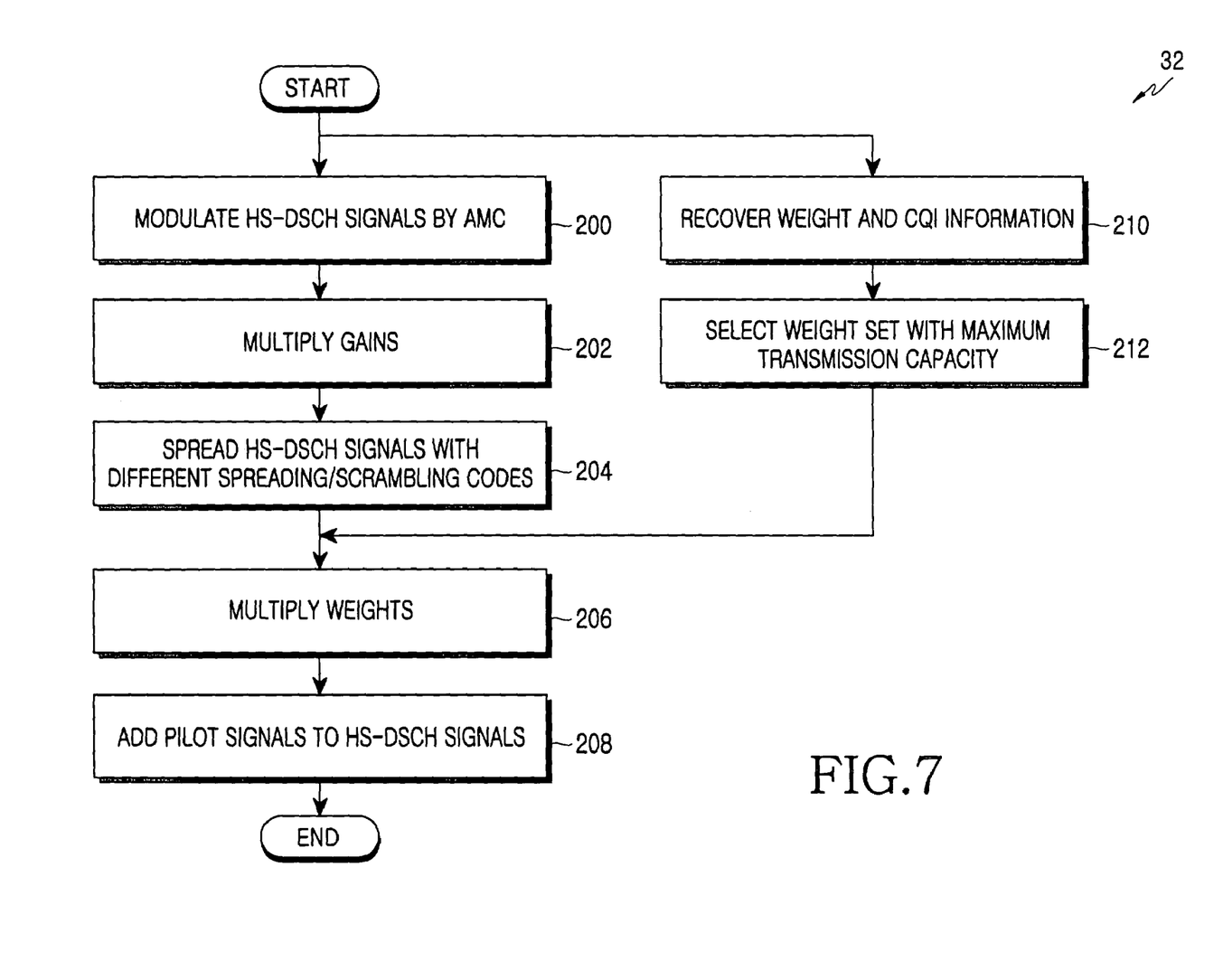
FIG. 7 is a detailed flowchart illustrating the operation of the Node B according to another embodiment of the present invention.
Figure 8:
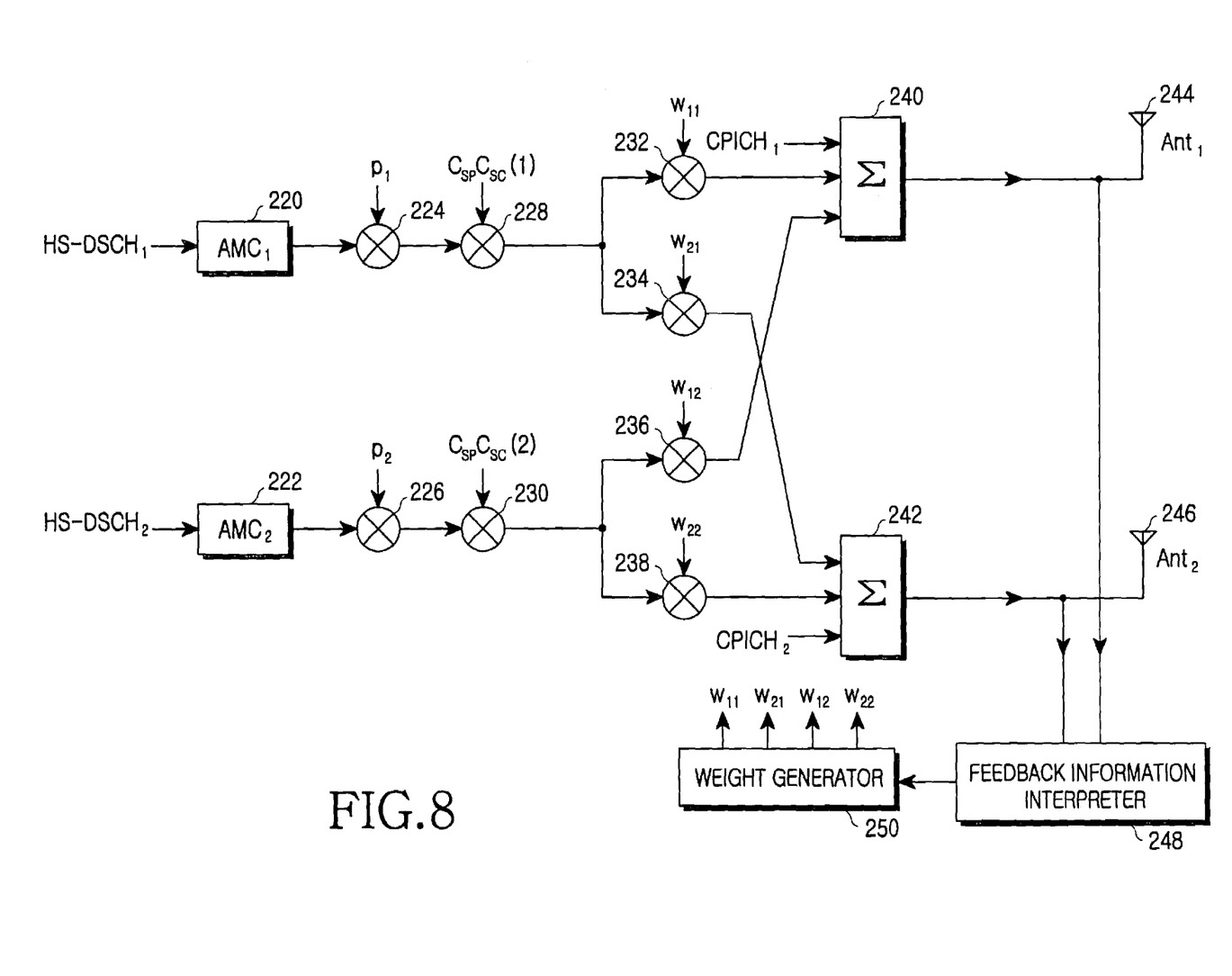
FIG. 8 is a block diagram of the Node B according to the second embodiment of the present invention.

FIG. 7 is a flowchart illustrating the operation of the Node B and FIG. 8 is a block diagram of the Node B according to the second embodiment of the present invention.

The Node B 10 illustrated in FIG. 8 is identical to the Node B 10 depicted in FIG. 4 in configuration. The Node 10 according to the second embodiment of the present invention is comprised of AMC units 220 and 222, gain multipliers 224 and 226, spreaders 228 and 230, weight multipliers 232, 234, 236 and 238, pilot summers 240 and 242, antennas 244 and 246, a feedback information interpreter 248, and a weight generator 250.

The feedback information interpreter 248 interprets weight & CQI information from feedback information received through the antennas 244 and 246 in step 210. The weight generator 250 selects optimum weights and gains according to the interpreted weight & CQI information and outputs the weights to the weight multipliers 232 to 238 and the gains to the gain multipliers 224 and 226 in step 212.

Step 210 is the same as step 60 of FIG. 3, and the weight generator 250 illustrated in FIG. 6 operates in the same manner as the counterpart 130 illustrated in FIG. 4.

Meanwhile, the AMC units 220 and 222 modulate HS-DSCH signals, $HS\text{-}DSCH_1$ and $HS\text{-}DSCH_2$ in a predetermined AMC in step 200. The gain multipliers 224 and 226 multiply the modulated signals by their respective gains $p_1$ and $p_2$ in step 202. The spreaders 228 and 230 multiply the outputs of the gain multipliers 224 and 226 by predetermined scrambling/spreading sequences and output the spread signals to the weight multipliers 232 to 238 in step 204. Specifically, the spreaders 228 and 230 multiply the outputs of the gain multipliers 224 and 226 by first and second spreading signals $C_{sp}C_{sc}(1)$ and $C_{sp}C_{sc}(2)$, respectively and output the spread signals to the weight multipliers 232 234 and 236 & 238, respectively.

The first and second spreading signals $C_{sp}C_{sc}(1)$ and $C_{sp}C_{sc}(2)$ include different scrambling codes $C_{sc}$. Therefore, if full orthogonality is not ensured between two user channels, the users are identified by the scrambling codes. On the other hand, if data transmission relies on only quasi-orthogonality between scrambling codes, not on orthogonality between multi-antenna channels, full orthogonality cannot be achieved. The resulting interference degrades the overall performance. Hence, the simultaneous use of multi-antenna channel orthogonality and the scrambling code quasi-orthogonality compensate for the insufficiency of the channel orthogonality even in the case of a small number of users.

In accordance with the present invention as described above, packet data is transmitted only to UEs having orthogonal channels of good quality according to feedback information about weights and CQIs from UEs, thereby increasing the overall transmission capacity of a mobile communication system. Consequently, nulling is applied to transmit antennas. Thus, packet data transmission is carried out in a manner that minimizes the correlations between the antennas and maximizes transmission capacity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for transmitting packet data through at least two transmit antennas in a packet data communication system using transmit antenna diversity, comprising:
    a feedback information interpreter for interpreting feedback information including channel quality indicators (CQIs) and antenna weights received from a plurality of user equipments (UEs) requesting a packet data service;
    a weight generator for classifying the antenna weights into orthogonal weight groups, selecting a maximum CQI for each of the orthogonal weight groups, summing a maximum CQI pair corresponding to each orthogonal weight pair of the orthogonal weight groups, and selecting weights corresponding to CQIs that form the greatest sum as antenna weights; and
    a transmitter for transmitting the packet data by applying the selected weights to the transmit antennas.

2. The apparatus of claim 1, wherein the weight generator comprises:
    a classifier for classifying the antenna weights from the interpreted feedback information into the weight groups;
    a first selector for selecting a maximum CQI for each of the weight groups;
    a summer for summing each maximum CQI pair corresponding to orthogonal weights; and
    a second selector for selecting the greatest CQI sum and generating weights corresponding to the CQIs that form the greatest CQI sum.

3. The apparatus of claim 1, wherein transmit antenna diversity is implemented using a transmit antenna array scheme.

4. The apparatus of claim 3, wherein the CQIs are generated in consideration of the weights according to the transmit antenna array scheme.

5. A method of transmitting packet data through at least two transmit antennas in a packet data communication system using transmit antenna diversity, comprising the steps of:
    receiving feedback information including channel quality indicators (CQIs) and antenna weights received from a plurality of user equipments (UEs) requesting a packet data service;
    classifying the antenna weights into weight groups and selecting a maximum CQI for each of the weight groups;
    summing a maximum CQI pair corresponding to each orthogonal weight pair of the weight groups, and selecting weights corresponding to CQIs that form the greatest sum; and
    transmitting packet data by applying the selected weights to the transmit antennas.

6. The method of claim 5, wherein the transmit antenna diversity is implemented using a transmit antenna array scheme.

7. The method of claim 6, wherein the CQIs are generated in consideration of the weights according to the transmit antenna array scheme.

8. An apparatus for transmitting packet data through at least two transmit antennas in a packet data communication system using transmit antenna diversity, comprising:
- a feedback information interpreter for interpreting feedback information including channel quality indicators (CQIs) and antenna weights received from a plurality of user equipments (UEs) requesting a packet data service;
- a weight generator for classifying the antenna weights into weight groups, selecting a maximum CQI for each of the weight groups, summing a maximum CQI pair corresponding to each weight pair to provide maximum orthogonality, and selecting weights corresponding to CQIs that form the greatest sum as antenna weights;
- a spreader for providing different scrambling codes to the transmit antennas to ensure maximum orthogonality for the transmit antennas; and
- a transmitter for transmitting the packet data by applying the selected weights to the transmit antennas.

9. The apparatus of claim 8, wherein the weight generator comprises:
- a classifier for classifying the antenna weights from the interpreted feedback information into the weight groups;
- a first selector for selecting a maximum CQI for each of the weight groups;
- a summer for summing a maximum CQI pair corresponding to each weight pair to provide maximum orthogonality; and
- a second selector for selecting the greatest CQI sum and generating weights corresponding to the CQIs that form the greatest CQI sum.

10. The apparatus of claim 8, wherein the transmit antenna diversity is implemented using a transmit antenna array scheme.

11. The apparatus of claim 10, wherein the CQIs are generated in consideration of the weights according to the transmit antenna array scheme.

12. A method of transmitting packet data through at least two transmit antennas in a packet data communication system using transmit antenna diversity, comprising the steps of:
- receiving feedback information including channel quality indicators (CQIs) and antenna weights from a plurality of user equipments (UEs) requesting a packet data service;
- classifying the antenna weights into weight groups, and selecting a maximum CQI for each of the weight groups;
- summing a maximum CQI pair corresponding to each weight pair to provide maximum orthogonality, and selecting weights corresponding to CQIs that form the greatest sum as antenna weights;
- providing different scrambling codes to the transmit antennas to ensure maximum orthogonality for the transmit antennas; and
- transmitting the packet data by applying the selected weights to the transmit antennas.

13. The method of claim 12, wherein the transmit antenna diversity is implemented using a transmit antenna array scheme.

14. The method of claim 13, wherein the CQIs are generated in consideration of the weights according to the transmit antenna array scheme.

* * * * *